US010952126B2

(12) United States Patent
Li et al.

(10) Patent No.: US 10,952,126 B2
(45) Date of Patent: Mar. 16, 2021

(54) TECHNIQUE FOR INDICATING MULTIPLE CORE NETWORKS IN A MESSAGE TRANSMISSION

(71) Applicant: ZTE Corporation, Guangdong (CN)

(72) Inventors: Wenting Li, Guangdong (CN); Dapeng Li, Guangdong (CN); Yuan Gao, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/596,734

(22) Filed: Oct. 8, 2019

(65) Prior Publication Data
US 2020/0112908 A1 Apr. 9, 2020

Related U.S. Application Data

(63) Continuation of application No. PCT/CN2017/097111, filed on Aug. 11, 2017.

(51) Int. Cl.
H04W 36/14 (2009.01)
H04W 48/08 (2009.01)

(52) U.S. Cl.
CPC .................. H04W 48/08 (2013.01)

(58) Field of Classification Search
CPC ................................................ H04W 48/04
See application file for complete search history.

(56) References Cited

U.S. PATENT DOCUMENTS 10,568,007 B2 * 2/2020 Park .................. H04W 36/0077
2018/0167918 A1 * 6/2018 Ishii ...................... H04W 48/12
2018/0352491 A1 * 12/2018 Shih ........................ H04W 8/02

FOREIGN PATENT DOCUMENTS

CN 106134256 A 11/2016
CN 106233784 A 12/2016
WO 2015/037820 A1 3/2015

OTHER PUBLICATIONS

Extended Search Report dated Dec. 20, 2019 for European Application No. 17920829.3, filed on Aug. 11, 2017 (8 pages).
Ericsson, "CN selection when accessing," 3GPP TSG-RAN WG2 #98, R2-1704177, Hangzhou, P.R. China, 2 pages, May 2017.
Samsung, "System Information Signalling Design in NR," 3GPP TSG-RAN WG2 Meeting #94, R2-163371, Nanjing, P.R. China, 7 pages, May 2016.

(Continued)

Primary Examiner — Michael T Vu
(74) Attorney, Agent, or Firm — Perkins Coie LLP

(57) ABSTRACT

Among other things described, a method of wireless communication includes transmitting, from a base station of a cell, to a user device requesting to camp on the cell, a message comprising a first field, wherein the first field is indicative of availability of another type of radio access technology (RAT) core network for communication via the base station, including, in the message, a second field whose value indicates that the user device is disallowed to access the another type of RAT core network, providing, when the user device is disallowed to camp on the cell, additional information regarding whether other intra-frequency cells that support the another type of radio access technology (RAT) core network are available for the user device to reselect.

12 Claims, 8 Drawing Sheets

(56) References Cited

OTHER PUBLICATIONS

International Search Report and Written Opinion dated May 2, 2018 for International Application No. PCT/CN2017/097111, filed on Aug. 11, 2017 (8 pages).
Office Action for Chinese Patent Application No. 2017800930036, dated Jul. 15, 2020.
3GPP TS 36.331 V13.2.0, Release 13, pp. 200-260, Jul. 2016.
Office Action for Chinese Patent Application No. 2017800930036, dated Jan. 14, 2020.

* cited by examiner

TECHNIQUE FOR INDICATING MULTIPLE CORE NETWORKS IN A MESSAGE TRANSMISSION

CROSS-REFERENCE TO RELATED APPLICATIONS

This patent document is a continuation of and claims priority to International Patent Application No. PCT/CN2017/097111, filed on Aug. 11, 2017. The entire content of the before-mentioned patent application is incorporated by reference as part of the disclosure of this application.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization. The next generation wireless communication networks are also expected to deploy new core networks that provide additional services and flexibility beyond currently available core networks.

SUMMARY

This document describes technologies, among other things, for indicating availability of core networks in a message transmission from a base station, and the use of such a message by a user device.

In one example aspect, a method of wireless communication is disclosed. The method includes transmitting, from a base station of a cell, to a user device requesting to camp on the cell, a message comprising a first field, wherein the first field is indicative of availability of another type of radio access technology (RAT) core network for communication via the base station, including, in the message, a second field whose value indicates that the user device is disallowed to access the another type of RAT core network, and providing, when the user device is disallowed to camp on the cell, additional information regarding whether other intra-frequency cells that support the another type of radio access technology (RAT) core network are available for the user device to reselect.

In another example aspect, a method of wireless communication is disclosed. The method includes receiving, by a user device during camping on a cell, a message comprising a first field, wherein the first field is indicative of availability of another type of radio access technology (RAT) core network for communication via a base station of the cell, determining, based on a second field in the message, whether the user device is allowed to camp on the cell, wherein a value of the second field indicates that the user device is disallowed to access the another type of RAT core network when the implementation version is incompatible with the another type of RAT core network, and obtaining additional information regarding other intra-frequency cells that support another type of radio access technology (RAT) core network available for the user device to reselect.

In yet another example aspect, a wireless communications apparatus comprising a processor is disclosed. The processor is configured to implement methods described herein.

In another example aspect, the various techniques described herein may be embodied as processor-executable code and stored on a computer-readable program medium.

The details of one or more implementations are set forth in the accompanying drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

In a traditional wireless communication system, a base station typically is in communication with a single type of core network. For example, a 3G base station will only access the 3G core network, 4G base station will only access the EPC core network, and so on. But with the advent of 5G technology, new architecture of a base station is emerging. The base station is called eLTE. An eLTE base station only connects to a 5G core network. For this scenario, eLTE system messages should indicate to the traditional UE that the traditional UE will not be able to access the current network because a traditional UE will not be able to access a 5G core network. In addition, in some embodiments, eLTE base stations can also be connected to the 4G EPC and 5G NGC, which implies that eLTE base stations not only support the traditional 4G terminal, but also could support a new terminal, which can support 5G technology terminal. This implies that eLTE system messages should have backward compatibility to ensure that traditional 4G terminals can properly parse system messages and access the network, and that the system messages also should indicate the 5G core network information they support. In summary, the eLTE system should use a new, enhanced message, so that the eLTE can meet the above needs.

This document describes the cell information related cells in the LTE system message, then introduces the knowledge of the shared network, and then introduces example embodiments of the eLTE technology and the related issues when the eLTE base station connects to different core networks.

In the LTE system broadcast message SIB1, there is a cell access information cell in which the public land mobile networks (PLMN) and the tracking area code (TAC) of the current cell configuration are indicated, and "cellBarred" and "intraFreqReselection" are included. The field "cellBarred" is used to indicate whether the UE can reside on the current cell. The field "intraFreqReselection" is used to indicate whether a UE can re-select a network with the same frequency. For example, when the current cell "cellBarred" indicates bar, the UE should not reside in the current cell.

The "IntraFreqReselection" information may be used to determine whether it can do the same frequency re-election. In this case, since the eNB only interacts with the EPC core network, the PLMN configured in the system message is the PLMN supported by the EPC connected by the eNB.

In some embodiments, with the introduction of shared networks, multiple PLMN and even multiple operators of different PLMN can share an eNB. In other words, an eNB can support multiple PLMN, so in the system broadcast message the eNB may find it desirable to broadcast multiple PLMN. The information may be entered in the system broadcast messages as a PLMN list. The receiving UE can choose to access their favorite PLMN, and access to the information in the PLMN list. The UE may then select the appropriate core network element for the UE.

Figure 1A:
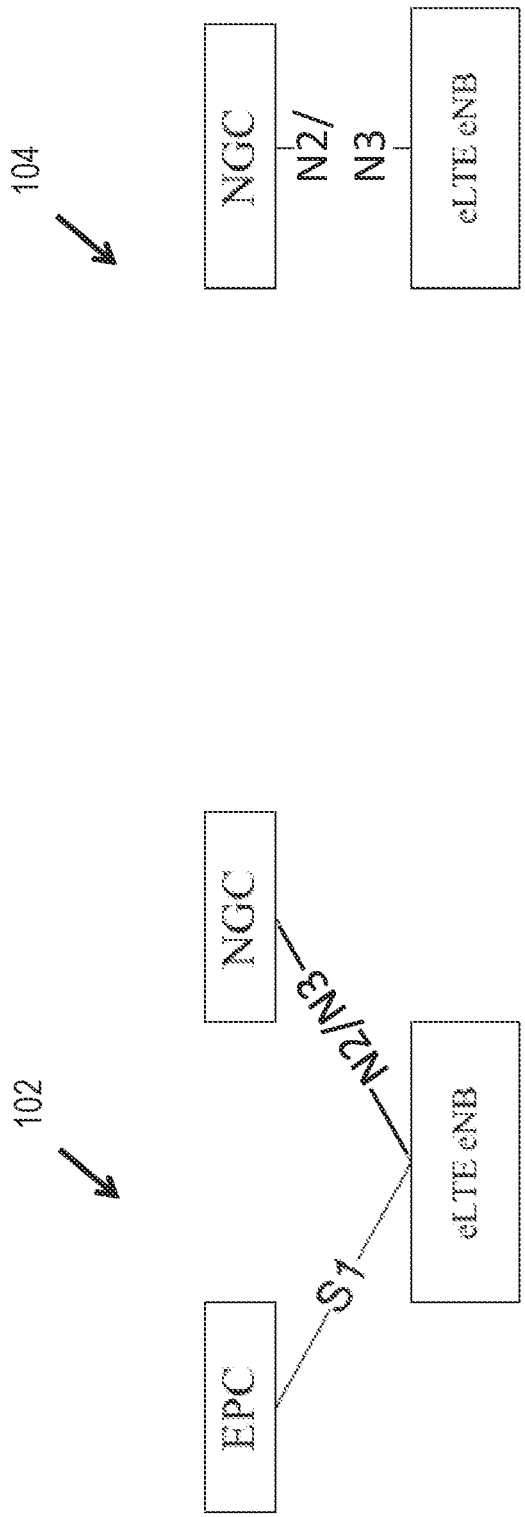
FIG. 1A shows block diagrams of examples of wireless system configurations.
Figure 1B:
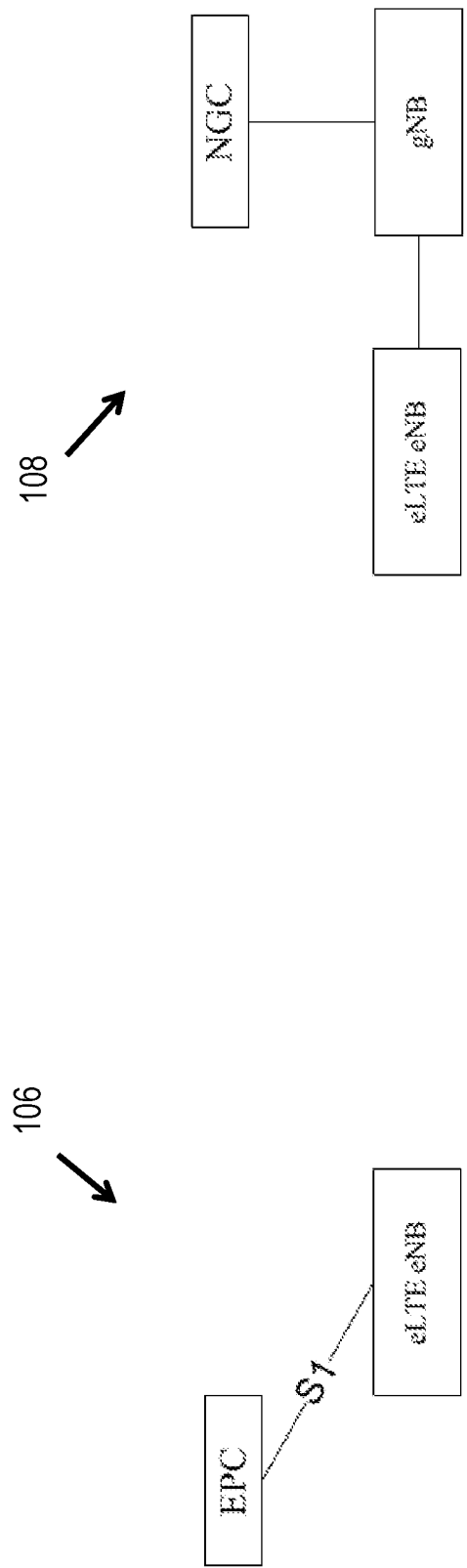
FIG. 1B shows block diagrams of examples of wireless system configurations.

FIG. 1A and FIG. 1B depict various examples of wireless network configurations with respect to the base stations, user devices and core networks to which the user devices can connect to. In the traditional wireless communication system, a base station will only connect one type of core network, such as 3G base station will only access the 3G core network, 4G base station will only access the EPC core network as shown in configuration 106 in FIG. 1B. But with the advent of 5G technology, in the 4G to 5G over the period, a base station, called eLTE base station is emerging as a possible deployment option. The eLTE base station may be used in a configuration as shown in configuration 104 in FIG. 1A, and may only connect 5G core network. For this scenario, eLTE system messages should to indicate the configuration such that legacy or traditional UEs are made aware that the current network is not accessible. In addition, as shown in configuration 102 of FIG. 1A, eLTE base stations can also be connected to the 4G EPC and 5G NGC, which also implies that eLTE base stations not only support the traditional 4G user devices, but also support the new user devices, that can support 5G technology. FIG. 1B also shows an architecture 108 in which the eLTE is communicatively connected to a next generation core (NGC) network through the gNB functionality as is specified by the upcoming 5G standard.

This means that eLTE system messages should have backward compatibility to ensure that traditional 4G terminals can properly parse system messages and access the network, and that the system messages also should indicate the 5G core network information they support. For example, when an eLTE base station is only connected to the 5G core, this requires that the eLTE system message design, to ensure that the traditional UE can decode the system message, but also to inform the traditional UE cannot access the base station, and the new UE can access the base station. In addition to this, eLTE also should support the shared network, such a simultaneous connection EPC and NGC eLTE base station, which may have multiple public land mobile networks (PLMN). Each PLMN may support different radio access technologies (RAT). For example PLMN1 may support only EPC, PLMN2 may support only support NGC, and PLMN3 may support both EPC and NGC. This information has to ensure that the traditional UE can correctly decode the system message on the basis of the current system messages to modify and expand.

The techniques described in the present document can be embodied in an eLTE or another type of base station. Using the techniques, an eLTE may implement a message enhancement scheme that enables the eLTE to broadcast relevant information of multiple RATs at the same time and be compatible with different implementation or protocol versions of the UE.

In some embodiments, the respective PLMN list and other relevant information of the cell are configured for different RATs. In some embodiments, the additional RAT PLMN list information and additional relevant information of the extended cell of the RAT can be placed in the "extended cell information" field. After receiving this information at the UE, the UE determines the RAT supported by the current cell and the corresponding list of PLMN according to the cell information of each RAT. For example, these PLMNs may be of the 4G or 5G types.

According to some embodiments, the eLTE eNB broadcasts a system message called the SIB1 (system information block 1) in the scenario as follows. The example of how the presently used SIB1 message may be modified is provides as an example implementation only.

Take the latest SIB1 definition in the 3gpp 36.331-e30 version as the baseline, the modification are shown in underlined bold face, and the extended CellAccessRelatedInfo may be put in the"SystemInformationBlockType1-v15xy-IEs." An example format is shown in Table 1 (See Appendix) in pseduo-code format.

Examples 1-1: eLTE Connection of 5G Core Network Only Scenarios

Table 2 (See Appendix) shows an example message syntax in a pseudo-code format for the situation that the eNB only connects to a 5G core network.

Figure 2:
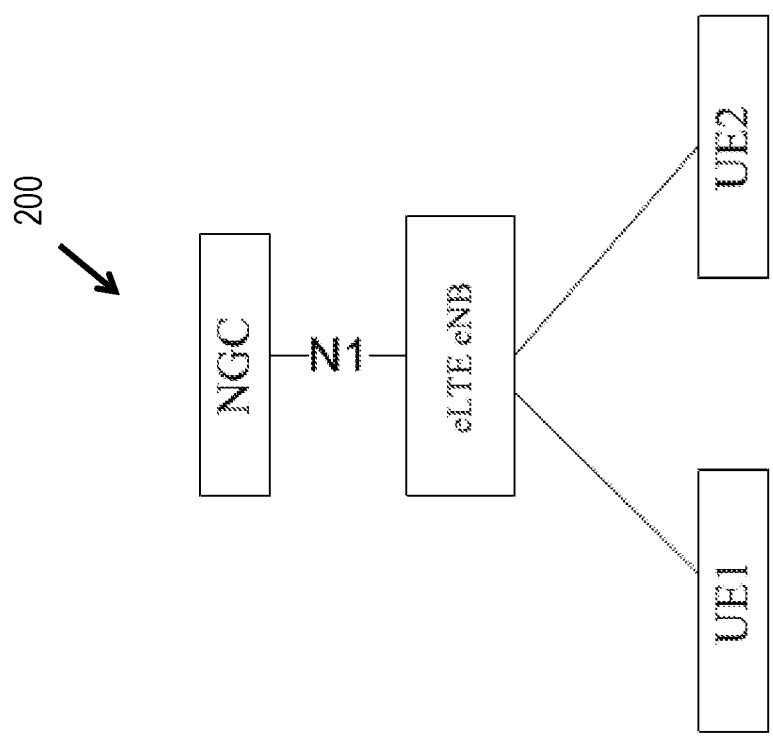
FIG. 2 shows an example configuration of an eLTE connected to a 5G core network.

FIG. 2 shows a configuration 200 in which an eLTE base station is able to communication with two UEs and offers a communication connection to the NGC core network. It is assumed that UE1 is a traditional UE, that is, only the "cellAccessRelatedInfo" part of SIB1 can be decoded, and UE2 is a UE supporting the NR core network, so it can decode "extended CellAccessRelatedInfo".

The following strategy can be used for conveying network information.

Step 1101: Set the default value in PLMN of the original CellAccessRelatedInfo in SIB1, or a value that conforms to the encoding specification, and sets the CellBar to "Barred" (e.g., not allowed to join).

Step 1102: Increase the extended cell information cell, such as the extended CellAccessRelatedInfo, including the newly added RAT PLMN list information and additional relevant information of the extended cell of the new RAT, where PLMN-IdentityList is the 5G core PLMN list information supported by the eLTE and set the CellBar element according to the current situation, and the intraFreqReselection.

The intraFreqReselection configuration is based on whether there are adjacent and support 5G of the same frequency cell settings.

Step 1103: After UE1 receives SIB1, since only the "cellAccessRelatedInfo" section could be decoded, it is found that the cell is Bar, so that it does not reside on this cell. After UE2 receives SIB1, it can also decode the "cellAccessRelatedInfo" "extended CellAccessRelatedInfo" section. If "cellBarred" is "cellBarred" in "extended CellAccessRelatedInfo", the UE understands that the cell is barred and cannot be resident, and then it can proceed according to the "intraFreqReselection," whether the system can do the intra-frequency re-election. If "extended CellAccessRelatedInfo" in the "cellBarred" is not barred, the UE can stay in the cell, followed by 5G NAS signaling 5G core network initiated by the relevant registration and related tasks.

Examples 1-2: eLTE Simultaneous Connection of 4G and 5G Core Network Scenarios

In some embodiments, the eLTE eNB broadcasts the SIB1 in the scenario as follows: where the extended CellAccessRelatedInfo is placed as an extension in the extended cell.

Figure 3:
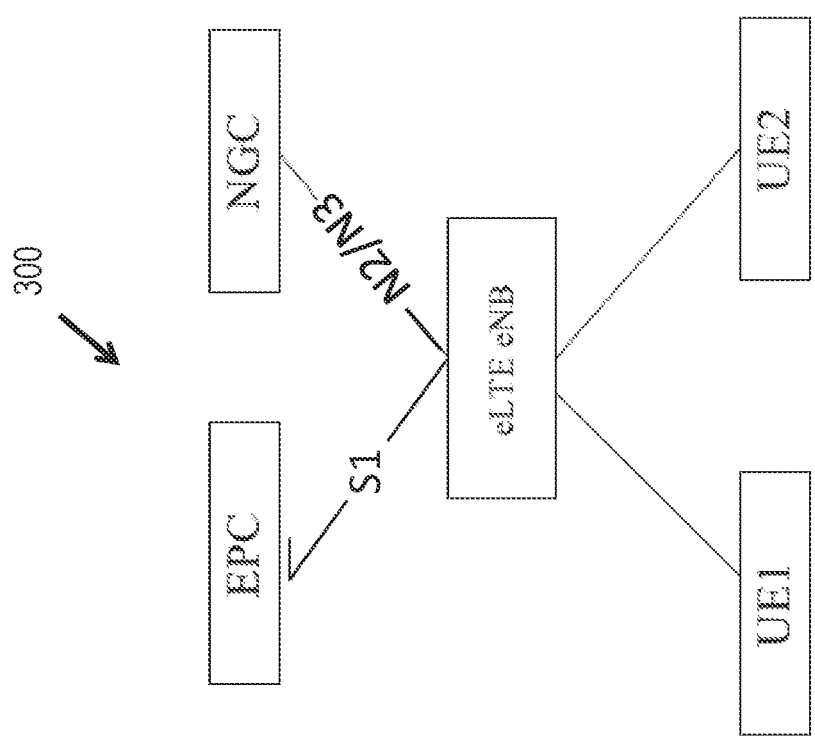
FIG. 3 shows an example of a configuration in which the eLTE is connected simultaneously to a 5G core network 4G core network (evolved packet core EPC).

In FIG. 3, configuration 300, it is assumed that UE1 is a traditional UE, that is, understands only the "cellAccessRelatedInfo" part of SIB1, and UE2 is a UE supporting the NR core network, so it can decode "extended CellAccessRelatedInfo". The following steps may be implemented.

Step 1201: Set the PLMN list in PLMN in the original CellAccessRelatedInfo in SIB1, and set the CellBar element according to the current situation.

Step 1202: Increase the extended cell information cell, such as the extended CellAccessRelatedInfo, including the newly added RAT PLMN list information and additional relevant information of the extended cell of the new RAT. Where PLMN-IdentityList is the 5G core PLMN list information supported by the eLTE and sets the CellBar element according to the current situation. The intraFreqReselection configuration is based on whether there are adjacent cells or base stations and whether they support the same frequency of 5G cell settings.

Step 1203: After UE1 receives SIB1, since "cellAccessRelatedInfo" is only decoded, if "cellBarred" in "cellAccessRelatedInfo" is bar, the UE considers the cell to be bar, and cannot be resident, and then it can be judged according to the "intraFreqReselection" You can do the same frequency re-election, or you can normally stay. And UE2 received SIB1, you can simultaneously solve the "cellAccessRelatedInfo" "extended CellAccessRelatedInfo" part.

The following rules may be implemented regarding the interpretation of these fields.

(1) If the "cellAccessRelatedInfo" "extended CellAccessRelatedInfo" in the "cellBarred" are barred, then the cell is considered bar, e.g., the UE cannot be resident on the cell, and then according to "intraFreqReselection" information to determine whether it can do the same frequency re-election.

(2) If only one of the instructions is a bar, the RAT that is not bar is selected.

(3) If both are not barred, the UE will register the extended RAT according to its own business rules, and may also select the original RAT resident according to the current business setting.

The presently disclosed techniques can be embodied in base stations for all possible variations of eLTE. In some embodiments, an eLTE system message enhancement scheme enables the eLTE to broadcast relevant information of multiple RATs at the same time and be compatible with different versions of the UEs, including legacy UEs.

Base station embodiments may configure the respective PLMN lists and other relevant information about the cells for different RATs. The additional RAT PLMN list information and additional relevant information of the extended cell of the RAT can be placed in the "extended cell information" cell.

After receiving the message at the UE, the UE determines the RAT supported by the current cell and the corresponding list of PLMN according to the cell information of each RAT.

Example 1

Different RAT configurations include separate PLMN listed among them.

(1) The list of PLMN supported by the original RAT continues; the new RAT PLMN list is added to indicate the PLMN list information supported by the new RAT.

(2) If an embodiment does not support the original RAT, the embodiment can fill in the original RAT PLMN default value, and the original cellbarred set to bar.

(3) If the new RAT is not supported, the system message remains unchanged, that is, the new PLMN RAT list information and other information of the cell are not added.

Example 2

Other related information, including cellbarred and intrafreqReselection information is provided.

(1) The original RAT cellbarred and intrafreqReselection information remain unchanged. In addition, the base station may add the new RAT cell Barred and intraFreqReseleciton information, used to indicate the new RAT cell Barred and intraFreqReseleciton information.

(2) If the original RAT is not supported, then set the original cellbarred to bar.

(3) If the new RAT is not supported, the system message remains unchanged.

Example 3

After receiving the system message, the UE judges the core network supported by the cell according to the PLMN list information and the cell bar information of the respective RAT and judges whether the cell can reside. Specifically:

(1) The UE that decodes only the original "cell information" decrypts the cell and processes the same.

(2) UEs that can simultaneously decode "cell information" and "extended cell information" can decode the "cell information" and the "extended cell information", and the network can be judged together based on the two information, network bar status, and according to their own business priority registration extended RAT, can also be based on the current business to select the original RAT resident.

Figure 4:
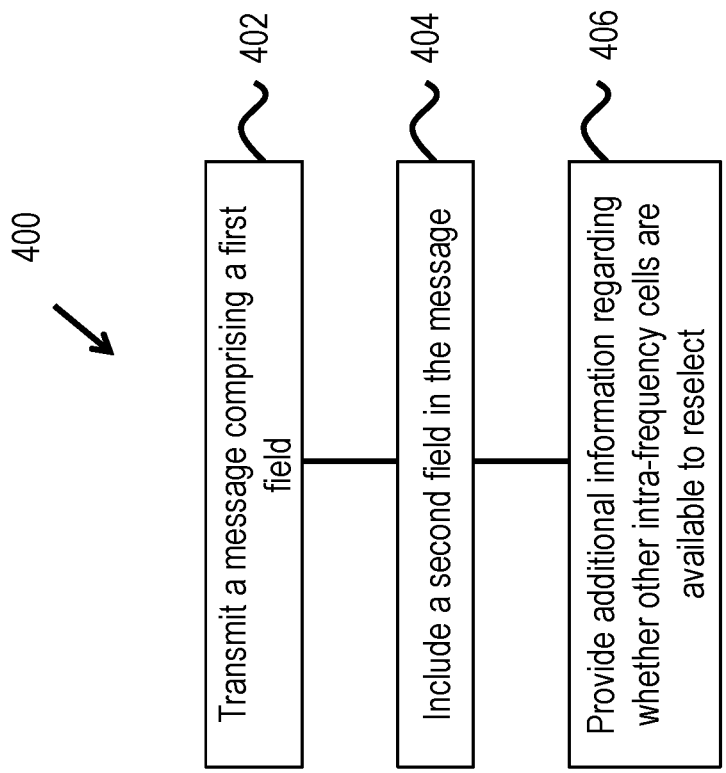
FIG. 4 is a flowchart of an example wireless communication method.

FIG. 4 is a flowchart of an example method 400 of wireless communication. The method 400 includes transmitting (402), from a base station of a cell, to a user device requesting to camp on the cell, a message comprising a first field, wherein the first field is indicative of availability of another type of radio access technology (RAT) core network for communication via the base station, including (404), in the message, a second field whose value indicates that the user device is disallowed to access the another type of RAT core network, and providing (406), when the user device is disallowed to camp on the cell, additional information regarding whether other intra-frequency cells that support the another type of radio access technology (RAT) core network are available for the user device to reselect.

Figure 5:
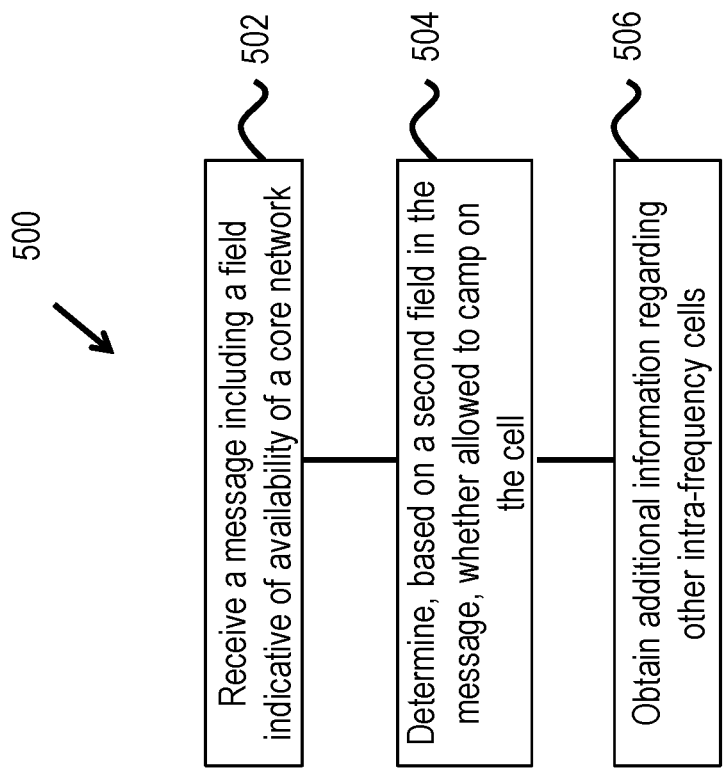
FIG. 5 is a flowchart of an example wireless communication method.

FIG. 5 is a flowchart of an example method 500 of wireless communication. The method 500 includes receiving (502), by a user device during camping on a cell, a message comprising a first field, wherein the first field is indicative of availability of another type of radio access technology (RAT) core network for communication via a base station of the cell, determining (504), based on a second field in the message, whether the user device is allowed to camp on the cell, wherein a value of the second field indicates that the user device is disallowed to access the another type of RAT core network when the implementation version is incompatible with the another type of RAT core network, and obtaining (506) additional information regarding other intra-frequency cells that support another type of radio access technology (RAT) core network available for the user device to reselect.

In methods 400 and 500, the "another type of RAT" or "another type of core network" may be a next generation core network such as a 5G core network. In methods 400 and 500, the message may comprise a system message such as a system information block, as described herein. In some embodiments, the another type of RAT core network may include a next generation network (e.g., 5G network) that is incompatible with a legacy version of the user device. For example, 4G and earlier versions of UEs may not be able to understand messages from a 5G core network.

In some embodiments, the additional information provided in methods 400 and 500 may include an indication regarding a frequency that the user device should use to evaluate intra-frequency cell reselection of the another type of RAT. In some embodiments, the additional information may indicate to the user device that it can use intra-frequency to join another wireless network.

Figure 6:
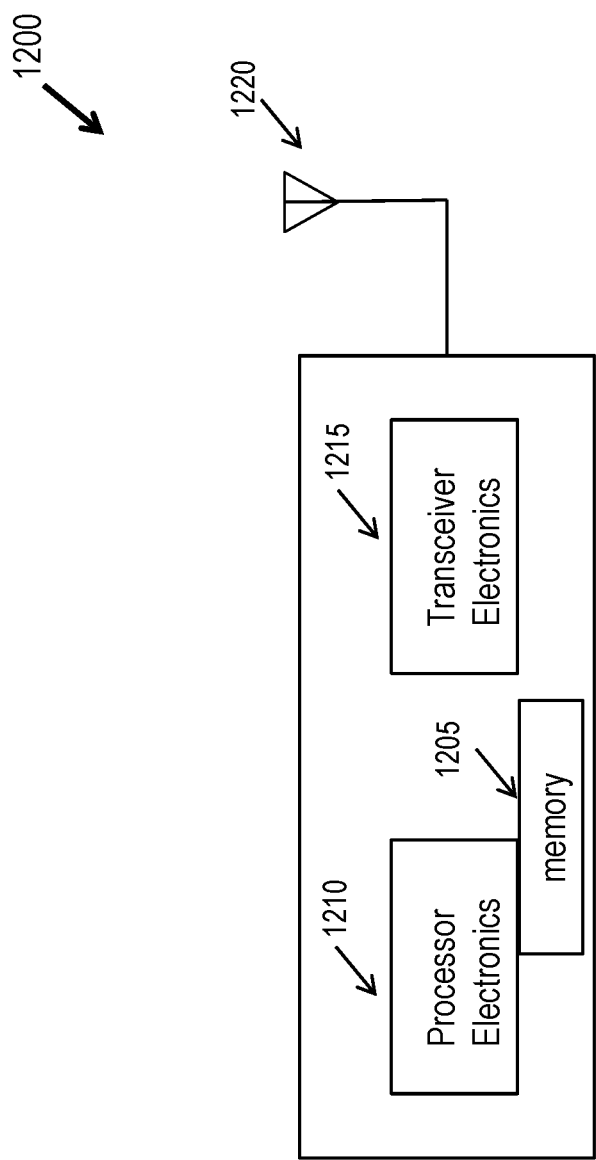
FIG. 6 is a block diagram of an example of a wireless communication apparatus.

FIG. 6 is a block diagram of an example implementation of a wireless communication apparatus 1200. The methods 400 or 500 may be implemented by the apparatus 1200. In some embodiments, e.g., when implementing method 400, the apparatus 1200 may be a base station of a wireless network. In some embodiments, e.g., when implementing method 500, the apparatus 1200 may be a user device. The apparatus 1200 includes one or more processors, e.g., processor electronics 1210, transceiver circuitry 1215 and one or more antenna 1220 for transmission and reception of wireless signals. The apparatus 1200 may include memory 1205 that may be used to store data and instructions used by the processor electronics 1210. The apparatus 1200 may also include an additional network interface to one or more core networks or a network operator's additional equipment. This additional network interface, not explicitly shown in FIG. 6, may be wired (e.g., fiber or Ethernet) or wireless.

Figure 7:
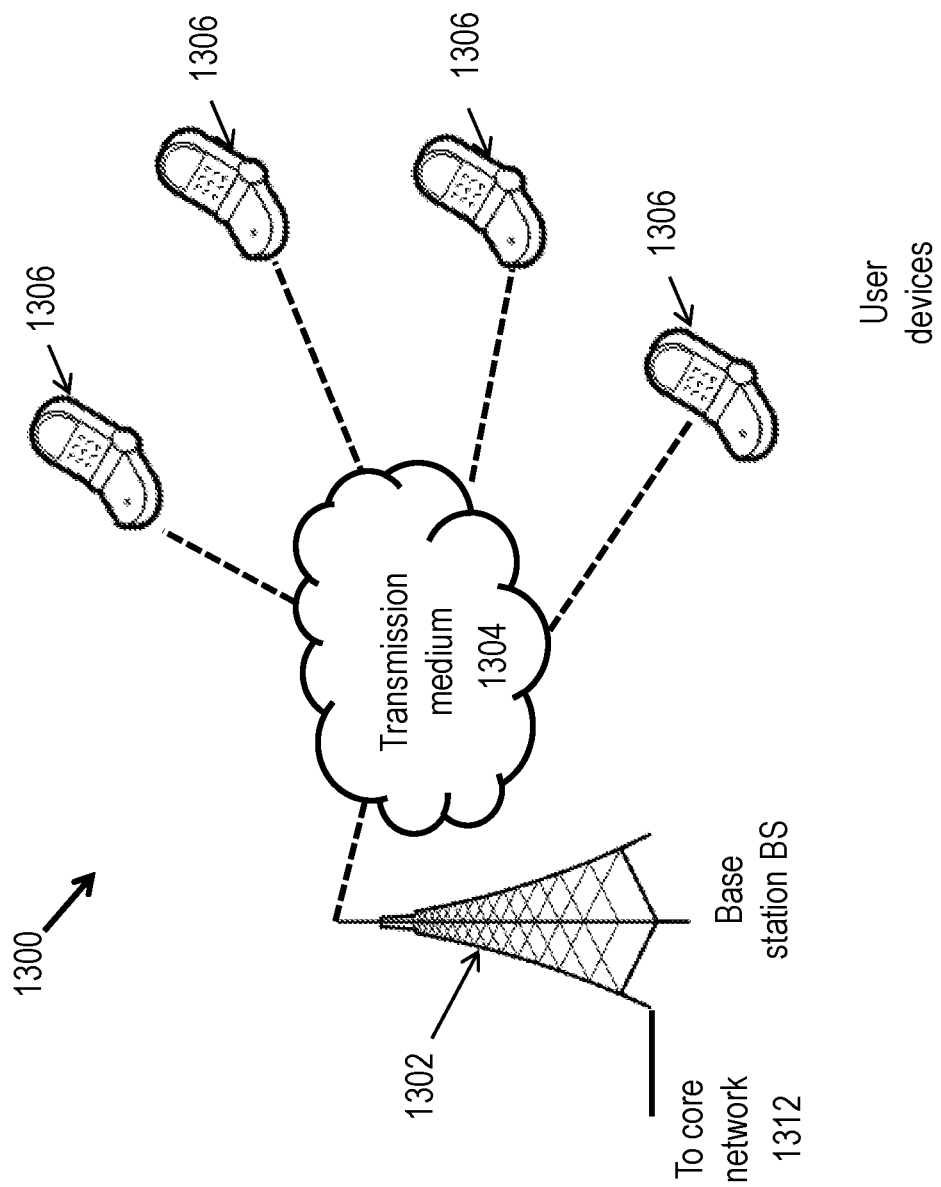
FIG. 7 shows an example wireless communications network.

FIG. 7 depicts an example of a wireless communication system 1300 in which the various techniques described herein can be implemented. The system 1300 includes a base station 1302 that may have a communication connection with core network (1312) and to a wireless communication medium 1304 to communicate with one or more user devices 1306. He user devices 1306 could be smartphones, tablets, machine to machine communication devices, Internet of Things (IoT) devices, and so on.

It will be appreciated that techniques that provide communication resources to user devices by including information in system messages regarding one or more core networks available to the user devices are disclosed. The information is conveyed to the user devices in a backward compatible manner. A user device not compatible with a currently available core network is instructed to not join the cell.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
    transmitting, from a base station to a user device, a system information block message, wherein the system information block message comprises:
        (1) a first field that includes cell access information for a first set of public land mobile networks (PLMNs) that provides access to an evolved packet core (EPC), the first field indicating whether a current cell is barred from providing network access to the user device in the EPC, and
        (2) a second field, separate from the first field, that includes cell access information for a second set of PLMNs that provides access to a Fifth-Generation (5G) core network, the second field indicating whether the current cell is barred from providing network access to the user device in the 5G core network; and
    providing, by the base station, communication services to the user device according to the message.

2. The method of claim 1, wherein the system information block message further comprises a third field indicating whether a reselection of a network within a same frequency is enabled.

3. A method for wireless communications, comprising:
    receiving, by a user device from a base station, a system information block message, wherein the system information block message comprises:
        (1) a first field that includes cell access information for a first set of public land mobile networks (PLMNs) that provides access to an evolved pack core (EPC), the first field indicating whether a current cell is barred from providing network access to the user device in the EPC, and
        (2) a second field, separate from the first field, that includes cell access information for a second set of PLMNs that provides access to a Fifth-Generation (5G) core network, the second field indicating whether the current cell is barred from providing network access to the user device in the 5G core network; and
    selecting, based on the first and second fields of the system information block message, the EPC or the 5G core network for communication services.

4. The method of claim 3, wherein the system information block message further comprises a third field indicating whether a reselection of a network within a same frequency is enabled.

5. A wireless communications apparatus comprising:
    a processor, and
    a memory including processor executable code, wherein the processor executable code upon execution by the processor configures the processor to:
    transmit, to a user device, a system information block message, wherein the system information block comprises:
        (1) a first field that includes cell access information for a first set of public land mobile networks (PLMNs) that provides access to an evolved packet core (EPC), the first field indicating whether current cell is barred from providing network access to the user device in the EPC, and
        (2) a second field, separate from the first field, that includes cell access information for a second set of PLMNs that provides access to a Fifth-Generation (5G) core network, the second field indicating whether the current cell is barred from providing network access to the user device in the 5G core network; and
    provide communication services to the user device according to the message.

6. The apparatus of claim 5, wherein the system information block message further comprises a third field indicating whether a reselection of a network within a same frequency is enabled.

7. A wireless communications apparatus comprising:
    a processor, and
    a memory including processor executable code, wherein the processor executable code upon execution by the processor configures the processor to:
    receive, from a base station, a system information block message, wherein the system information block message comprises:
        (1) a first field that includes cell access information for a first set of public land mobile networks (PLMNs) that provides access to an evolved pack core (EPC), the first field indicating whether current cell is barred from providing network access to the user device in the EPC, and
        (2) a second field, separate from the first field, that includes cell access information for a second set of PLMNs that provides access to a Fifth-Generation (5G) core network, the second field indicating whether the current cell is barred from providing network access in the 5G core network; and
    select, based on the first and second fields of the message, the EPC or the 5G core network for communication services.

8. The apparatus of claim 7, wherein the system information block message further comprises a third field indicating whether a reselection of a network within a same frequency is enabled.

9. A non-transitory computer program product comprising a computer-readable program medium code stored thereupon, the code, when executed by a processor, causing the processor to:
    transmit, to a user device, a system information block message, wherein the system information block message comprises:
        (1) a first field that includes cell access information for a first set of public land mobile networks (PLMNs) that provides access to an evolved packet core (EPC), the first field indicating whether current cell is barred from providing network access to the user device in the EPC, and (2) a second field, separate from the first field, that includes a list of cell access information for a second set of PLMNs that provides access to a Fifth-Generation (5G) core network, the second field indicating whether the current cell is barred from providing network access to the user device in the 5G core network; and provide communication services to the user device according to the message.

10. The non-transitory computer program product of claim 9, wherein the system information block message further comprises a third field indicating whether a reselection of a network within a same frequency is enabled.

11. A non-transitory computer program product comprising a computer-readable program medium code stored thereupon, the code, when executed by a processor, causing the processor to:

receive, from a base station, a system information block message, wherein the system information block message comprises:

(1) a first field that including cell access information for a first set of public land mobile networks (PLMNs) that provides access to an evolved pack core (EPC), the first field indicating whether current cell is barred from providing network access to the user device in the EPC, and (2) a second field, separate from the first field, that includes cell access information for a second set of PLMNs that provides access to a Fifth-Generation (5G) core network, the second field indicating whether the current cell is barred from providing network access in the 5G core network; and select, based on the first and second fields of the message, the EPC or the 5G core network for communication services.

12. The non-transitory computer program product of claim 11, wherein the system information block message further comprises a third field indicating whether a reselection of a network within a same frequency is enabled.

* * * * *

UNITED STATES PATENT AND TRADEMARK OFFICE
CERTIFICATE OF CORRECTION

PATENT NO. : 10,952,126 B2
APPLICATION NO. : 16/596734
DATED : October 8, 2019
INVENTOR(S) : Wenting Li et al.

It is certified that error appears in the above-identified patent and that said Letters Patent is hereby corrected as shown below:

In the Specification

In Column 2, Line 19, delete "(evolved packet core EPC)." and insert -- evolved packet core (EPC). --, therefor.

In Column 2, Line 63, delete "(PLMN)" and insert -- (PLMNs) --, therefor.

In Column 3, Line 32, delete "should to indicate" and insert -- should indicate --, therefor.

In Column 3, Line 55, delete "such a" and insert -- such as a --, therefor.

In Column 3, Line 57, delete "(PLMN)." and insert -- (PLMNs). --, therefor.

In Column 4, Line 18, delete "provides as" and insert -- provided as --, therefor.

In Column 4, Line 25, delete "pseduo-code" and insert -- pseudo-code --, therefor.

In Column 4, Line 34, delete "communication" and insert -- communicate --, therefor.

In Column 5, Line 30, delete "be bar," and insert -- be barred, --, therefor.

In Column 6, Line 15, delete "intrafreqReselection" and insert -- intraFreqReselection --, therefor.

In Column 6, Line 16, delete "intrafreqReselection" and insert -- intraFreqReselection --, therefor.

In Column 6, Line 18, delete "cell Barred" and insert -- cellBarred --, therefor.

In Column 6, Line 18, delete "intraFreqReseleciton" and insert -- intraFreqReselection --, therefor.

In Column 6, Line 19, delete "cell Barred" and insert -- cellBarred --, therefor.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*

In Column 6, Line 20, delete "intraFreqReseleciton" and insert -- intraFreqReselection --, therefor.

In Column 7, Line 29, delete "transceiver circuitry 1215" and insert -- transceiver electronics 1215 --, therefor.

In Column 7, Line 44, delete "1306. He" and insert -- 1306. The --, therefor.

In Column 8, Line 2, delete "more them." and insert -- more of them. --, therefor.

In Column 8, Lines 58-59, delete "CD ROM" and insert -- CD-ROM --, therefor.

In the Appendix

In the Appendix -- insert Table 1:

*Table 1: Example SystemInformationBlockType1 message*

```
-- ASN1START

SystemInformationBlockType1 ::=    SEQUENCE {
   cellAccessRelatedInfo           SEQUENCE {
      plmn-IdentityList               PLMN-IdentityList,
      trackingAreaCode                TrackingAreaCode,
```
--

```
        cellIdentity              CellIdentity,
        cellBarred                ENUMERATED {barred, notBarred},
        intraFreqReselection      ENUMERATED {allowed, notAllowed},
        csg-Indication            BOOLEAN,
        csg-Identity              CSG-Identity            OPTIONAL    -- Need OR
    },
    cellSelectionInfo             SEQUENCE {
        q-RxLevMin                Q-RxLevMin,
        q-RxLevMinOffset          INTEGER (1..8)          OPTIONAL    -- Need OP
    },
    p-Max                         P-Max                   OPTIONAL,   -- Need OP
    freqBandIndicator             FreqBandIndicator,
    schedulingInfoList            SchedulingInfoList,
    tdd-Config                    TDD-Config              OPTIONAL,   -- Cond TDD
    si-WindowLength               ENUMERATED {
                                    ms1, ms2, ms5, ms10, ms15, ms20,
                                    ms40},
    systemInfoValueTag            INTEGER (0..31),
    nonCriticalExtension          SystemInformationBlockType1-v890-IEs   OPTIONAL
}

SystemInformationBlockType1-v890-IEs ::= SEQUENCE {
    lateNonCriticalExtension      OCTET STRING (CONTAINING SystemInformationBlockType1-v8h0-IEs)   OPTIONAL,
    nonCriticalExtension          SystemInformationBlockType1-v920-IEs   OPTIONAL
```

```
}

-- Late non critical extensions
SystemInformationBlockType1-v8h0-IEs ::=    SEQUENCE {
   multiBandInfoList          MultiBandInfoList    OPTIONAL,
   -- Need OR
   nonCriticalExtension       SystemInformationBlockType1-
v9e0-IEs   OPTIONAL
}

SystemInformationBlockType1-v9e0-IEs ::= SEQUENCE {
   freqBandIndicator-v9e0        FreqBandIndicator-v9e0
   OPTIONAL,   -- Cond FBI-max
   multiBandInfoList-v9e0        MultiBandInfoList-v9e0
   OPTIONAL,   -- Cond mFBI-max
   nonCriticalExtension          SystemInformationBlockType1-
v10j0-IEs   OPTIONAL
}

SystemInformationBlockType1-v10j0-IEs ::= SEQUENCE {
   freqBandInfo-r10           NS-PmaxList-r10
   OPTIONAL,   -- Need OR
   multiBandInfoList-v10j0       MultiBandInfoList-v10j0
   OPTIONAL,   -- Need OR
   nonCriticalExtension       SEQUENCE {}           OPTIONAL
}

-- Regular non critical extensions
SystemInformationBlockType1-v920-IEs ::=    SEQUENCE {
   ims-EmergencySupport-r9       ENUMERATED {true}
   OPTIONAL,   -- Need OR
   cellSelectionInfo-v920        CellSelectionInfo-v920
   OPTIONAL,   -- Cond RSRQ
```

```
      nonCriticalExtension         SystemInformationBlockType1-
v1130-IEs  OPTIONAL
}

SystemInformationBlockType1-v1130-IEs ::=  SEQUENCE {
   tdd-Config-v1130           TDD-Config-v1130          OPTIONAL,
   -- Cond TDD-OR cellSelectionInfo-v1130    CellSelectionInfo-v1130
OPTIONAL,  -- Cond WB-RSRQ nonCriticalExtension       SystemInformationBlockType1-v1250-
IEs  OPTIONAL
}

SystemInformationBlockType1-v1250-IEs ::=  SEQUENCE {
   cellAccessRelatedInfo-v1250            SEQUENCE {
      category0Allowed-r12                ENUMERATED {true}
   OPTIONAL   -- Need OP
   }, cellSelectionInfo-v1250          CellSelectionInfo-v1250
OPTIONAL,  -- Cond RSRQ2 freqBandIndicatorPriority-r12    ENUMERATED {true}
OPTIONAL,  -- Cond mFBI nonCriticalExtension         SystemInformationBlockType1-v1310-
IEs  OPTIONAL
}

SystemInformationBlockType1-v1310-IEs ::=  SEQUENCE {
   hyperSFN-r13                   BIT STRING (SIZE (10))
OPTIONAL,  -- Need OR eDRX-Allowed-r13               ENUMERATED {true}
OPTIONAL,  -- Need OR cellSelectionInfoCE-r13        CellSelectionInfoCE-r13
OPTIONAL,  -- Need OP
```

```
    bandwidthReducedAccessRelatedInfo-r13 SEQUENCE {
       si-WindowLength-BR-r13              ENUMERATED {
                                           ms20, ms40, ms60, ms80, ms120,
                                           ms160, ms200, spare},
       si-RepetitionPattern-r13            ENUMERATED {everyRF,
every2ndRF, every4thRF,
                                           every8thRF},
       schedulingInfoList-BR-r13           SchedulingInfoList-BR-
r13   OPTIONAL,   -- Need OR
       fdd-DownlinkOrTddSubframeBitmapBR-r13 CHOICE {
          subframePattern10-r13            BIT STRING (SIZE (10)),
          subframePattern40-r13            BIT STRING (SIZE (40))
       }                                               OPTIONAL,  --
Need OP
       fdd-UplinkSubframeBitmapBR-r13      BIT STRING (SIZE (10))
       OPTIONAL,   -- Need OP
       startSymbolBR-r13                   INTEGER (1..4),
       si-HoppingConfigCommon-r13          ENUMERATED {on,off},
       si-ValidityTime-r13                 ENUMERATED {true}
   OPTIONAL,          -- Need OP
       systemInfoValueTagList-r13          SystemInfoValueTagList-
r13   OPTIONAL    -- Need OR
   }                                                   OPTIONAL,  -- Cond
BW-reduced
   nonCriticalExtension
   SystemInformationBlockType1-v1320-IEs OPTIONAL
}

SystemInformationBlockType1-v1320-IEs ::=   SEQUENCE {
   freqHoppingParametersDL-r13             SEQUENCE {
      mpdcch-pdsch-HoppingNB-r13           ENUMERATED {nb2, nb4}
   OPTIONAL,   -- Need OR
      interval-DLHoppingConfigCommonModeA-r13 CHOICE {
```

```
            interval-FDD-r13               ENUMERATED {int1, int2, int4, int8}, interval-TDD-r13               ENUMERATED {int1, int5, int10, int20}

}                                                     OPTIONAL,    --  Need OR interval-DLHoppingConfigCommonModeB-r13 CHOICE { interval-FDD-r13               ENUMERATED {int2, int4, int8, int16}, interval-TDD-r13               ENUMERATED { int5, int10, int20, int40}

}                                                     OPTIONAL,    -- Need OR mpdcch-pdsch-HoppingOffset-r13              INTEGER (1..maxAvailNarrowBands-r13)  OPTIONAL    -- Need OR }                                                         OPTIONAL,   -- Cond Hopping nonCriticalExtension         SystemInformationBlockType1-v1350-IEs          OPTIONAL

}

SystemInformationBlockType1-v1350-IEs ::=  SEQUENCE {
    cellSelectionInfoCE1-r13          CellSelectionInfoCE1-r13   OPTIONAL,  -- Need OP nonCriticalExtension              SystemInformationBlockType1-v1360-IEs        OPTIONAL

}

SystemInformationBlockType1-v1360-IEs ::=  SEQUENCE {
    cellSelectionInfoCE1-v1360        CellSelectionInfoCE1-v1360   OPTIONAL,   -- Cond QrxlevminCE1 nonCriticalExtension              SystemInformationBlockType1-v1430-IEs    OPTIONAL

}
```

```
SystemInformationBlockType1-v1430-IEs ::= SEQUENCE {
   eCallOverIMS-Support-r14          ENUMERATED {true}
   OPTIONAL,   -- Need OR
   tdd-Config-v1430                  TDD-Config-v1430
   OPTIONAL,   -- Cond TDD-OR
   cellAccessRelatedInfoList-r14     SEQUENCE (SIZE (1..maxPLMN-1-r14)) OF
                                     CellAccessRelatedInfo-r14
   OPTIONAL,   -- Need OR
   nonCriticalExtension              SystemInformationBlockType1-v15xy-IEs  OPTIONAL
}
SystemInformationBlockType1-v15xy-IEs ::= SEQUENCE {
   CellAccessRelatedInfo-5GC         SEQUENCE {
      plmn-IdentityList              PLMN-IdentityList,
      cellBarred                     ENUMERATED {barred, notBarred},
      intraFreqReselection           ENUMERATED {allowed, notAllowed}
   },
   nonCriticalExtension              SEQUENCE {}
   OPTIONAL
}

PLMN-IdentityList ::=          SEQUENCE (SIZE (1..maxPLMN-r11)) OF PLMN-IdentityInfo PLMN-IdentityInfo ::=          SEQUENCE { plmn-Identity                  PLMN-Identity, cellReservedForOperatorUse     ENUMERATED {reserved, notReserved}

}

SchedulingInfoList ::= SEQUENCE (SIZE (1..maxSI-Message)) OF SchedulingInfo

SchedulingInfo ::= SEQUENCE { si-Periodicity                 ENUMERATED {
                                  rf8, rf16, rf32, rf64, rf128,
```

```
rf256, rf512},
    sib-MappingInfo                SIB-MappingInfo
}

SchedulingInfoList-BR-r13 ::= SEQUENCE (SIZE (1..maxSI-Message))
OF SchedulingInfo-BR-r13

SchedulingInfo-BR-r13 ::=   SEQUENCE {
    si-Narrowband-r13          INTEGER (1..maxAvailNarrowBands-
r13),
    si-TBS-r13                 ENUMERATED {b152, b208, b256, b328,
b408, b504, b600, b712,
                                 b808, b936}
}

SIB-MappingInfo ::= SEQUENCE (SIZE (0..maxSIB-1)) OF SIB-Type

SIB-Type ::=                ENUMERATED {
                              sibType3, sibType4, sibType5,
sibType6,
                              sibType7, sibType8, sibType9,
sibType10,
                              sibType11, sibType12-v920, sibType13-
v920,
                              sibType14-v1130, sibType15-v1130,
                              sibType16-v1130, sibType17-v1250,
sibType18-v1250,
                              ..., sibType19-v1250, sibType20-v1310,
sibType21-v1430}

SystemInfoValueTagList-r13 ::=    SEQUENCE (SIZE (1..maxSI-
Message)) OF SystemInfoValueTagSI-r13
```

```
SystemInfoValueTagSI-r13 ::=      INTEGER (0..3)

CellSelectionInfo-v920 ::=        SEQUENCE {
   q-QualMin-r9               Q-QualMin-r9,
   q-QualMinOffset-r9         INTEGER (1..8)
   OPTIONAL      -- Need OP
}

CellSelectionInfo-v1130 ::=       SEQUENCE {
   q-QualMinWB-r11            Q-QualMin-r9
}

CellSelectionInfo-v1250 ::=       SEQUENCE {
   q-QualMinRSRQ-OnAllSymbols-r12              Q-QualMin-r9
}

CellAccessRelatedInfo-r14 ::= SEQUENCE {
   plmn-IdentityList-r14      PLMN-IdentityList,
   trackingAreaCode-r14       TrackingAreaCode,
   cellIdentity-r14           CellIdentity
}

-- ASN1STOP
```
--.

In the Appendix -- insert Table 2:

*Table 2*

| SystemInformationBlockType1 ::=    SEQUENCE { |
|---|
| cellAccessRelatedInfo           SEQUENCE { |
| plmn-IdentityList           PLMN-IdentityList---set to |

--

```
default value,

...

cellBarred                ENUMERATED {barred, notBarred}---
set as Barred, intraFreqReselection      ENUMERATED {allowed,
notAllowed},

...

},

..…..

SystemInformationBlockType1-v15xy-IEs ::= SEQUENCE {
    CellAccessRelatedInfo-5GC    SEQUENCE { plmn-IdentityList         PLMN-IdentityList---set to
support the 5G PLMN list,          cellBarred
   ENUMERATED {barred, notBarred}---Set according to the current
situation of the cell, intraFreqReselection         ENUMERATED {allowed,
notAllowed}---set based upon availability of adjacent 5G base
stations with the same frequency settings

} nonCriticalExtension         SEQUENCE {}
    OPTIONAL
}
```
--.

In the Claims

In Column 9, Line 50, in Claim 3, delete "evolved pack core (EPC)," and insert -- evolved packet core (EPC), --, therefor.

In Column 10, Line 12, in Claim 5, delete "whether current" and insert -- whether a current --, herefor.

In Column 10, Line 38, in Claim 7, delete "evolved pack core (EPC)," and insert -- evolved packet core (EPC), --, therefor.

In Column 10, Line 39, in Claim 7, delete "whether current" and insert -- whether a current --, therefor.

CERTIFICATE OF CORRECTION (continued)
U.S. Pat. No. 10,952,126 B2

In Column 10, Line 65, in Claim 9, delete "whether current" and insert -- whether a current --, therefor.

In Column 12, Line 1, in Claim 11, delete "that including" and insert -- that includes --, therefor.

In Column 12, Line 3, in Claim 11, delete "evolved pack core (EPC)," and insert -- evolved packet core (EPC), --, therefor.

In Column 12, Line 4, in Claim 11, delete "whether current" and insert -- whether a current --, therefor.